United States Patent [19]

Beaumont

[11] Patent Number: 5,421,250

[45] Date of Patent: Jun. 6, 1995

[54] LETTUCE CLEANING MACHINE

[75] Inventor: Laurent Beaumont, Coutances, France

[73] Assignee: Societe Legumiere du Cotentin, France

[21] Appl. No.: 99,778

[22] Filed: Jul. 29, 1993

[30] Foreign Application Priority Data

Jul. 30, 1992 [FR] France ................. 92 09437

[51] Int. Cl.[6] .................. A23N 7/00; A23N 15/04
[52] U.S. Cl. ......................... 99/636; 99/546; 99/642; 99/643
[58] Field of Search ................ 99/537, 538, 546, 584, 99/635–639, 641–643

[56] References Cited

U.S. PATENT DOCUMENTS

| | | | |
|---|---|---|---|
| 1,366,188 | 1/1921 | Kirino | 99/642 |
| 3,111,972 | 11/1963 | Anderson et al. | 99/546 |
| 4,099,456 | 7/1978 | Cornish | 99/638 |
| 4,176,595 | 12/1979 | Shaw | 99/643 |
| 4,373,432 | 2/1983 | Tsutsumi | 99/546 |
| 4,453,458 | 6/1984 | Altman | 99/642 |
| 4,718,334 | 1/1988 | Nagaoka | 99/636 |

FOREIGN PATENT DOCUMENTS 0419349 9/1990 European Pat. Off. .

*Primary Examiner*—Timothy F. Simone
*Attorney, Agent, or Firm*—Jones & Askew

[57] ABSTRACT

Machine comprising carriages (2) each provided with a rotatably mounted head supporting a gripping device (5) for grasping a lettuce in the suspended state below this carriage, and a closed-circuit conveying path (4) on which the carriages circulate, characterised in that the gripping device comprises, firstly, movable needles which slide between an extended position for grasping a lettuce and a position retracted inside the head, and, secondly, movable hooks which pivot at the end of the head between a spaced-apart position and a closed-together position for grasping the lettuce, these needles and hooks being placed in the active position to grasp a lettuce in different areas of the conveying path.

6 Claims, 3 Drawing Sheets

LETTUCE CLEANING MACHINE

BACKGROUND OF THE INVENTION

This invention relates in general to lettuce cleaning machines, and relates in particular to a lettuce cleaning machine with gripping devices for grasping the lettuce.

SUMMARY OF THE INVENTION

The machine according to the invention comprises carriages, each provided with a rotatably mounted head which supports a gripping device for grasping a lettuce in the suspended state below this carriage, a closed-circuit conveying path on which the carriages circulate, cutting stations disposed along this conveying path, these stations being provided with means for cutting the lettuce and means for rotating the head of the carriage, the machine being characterised in that the gripping device comprises, firstly, movable needles which slide between an extended position for grasping a lettuce as a result of the needles penetrating the end of the stump of the lettuce and a position retracted inside the head, and, secondly, movable hooks which pivot at the end of the head between a spaced-apart position and a closed-together position for grasping a lettuce as a result of the hooks penetrating sideways into the base of the lettuce and the stump, these needles and hooks being placed in the active position for grasping a lettuce in different areas of the conveying path.

In accordance with a further feature of the invention, the needles are placed in the active position at a lettuce grasping station of the conveying path and the hooks are subsequently placed in the active position in the direction in which the carriages advance along this conveying path.

In accordance with a further feature of the invention, the conveying path consists at least partially of a pair of continuous belts supporting the carriages on friction pads.

BRIEF DESCRIPTION OF THE DRAWING

The invention is illustrated by way of non-limiting example in the attached drawings in which.

DESCRIPTION OF THE PREFERRED EMBODIMENT

The object of the present invention is thus to provide a lettuce cleaning installation which has a high output, whilst requiring only a very small labour force, this installation further enabling the risks of accidents of which this labour force could be the victim to be reduced.

The lettuce to be cleaned and cut into pieces in order to be sold in bags is grasped in the suspended state under carriages 2 which move on a pair of rails 3 of a closed-circuit conveying path 4. Each lettuce is suspended at its base by a gripping device 5.

Figure 1:
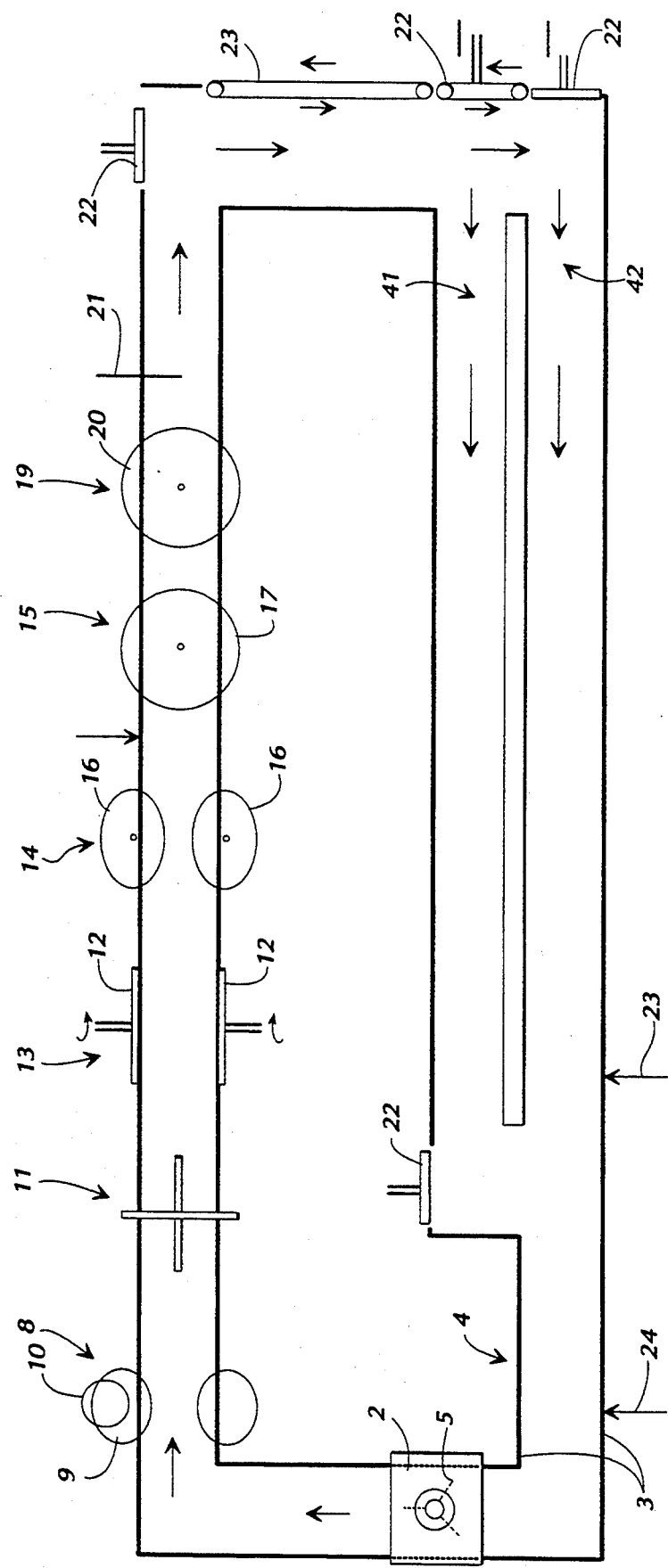
FIG. 1 is a schematic front view of a lettuce cleaning installation.

The carriages each supporting a lettuce are moved along the circuit 4 and, in the example illustrated in FIG. 1, are firstly brought to the level of a first cutting station 8 comprising cutting discs 9 which are rotated and which are disposed in a vertical plane such that they penetrate the lettuce at the level of the base of the outer leaves, i.e. in the vicinity of its stump.

At the level of this station, and of all the following stations, there is also provided a drive roller 10 or the like which comes into connection with a drive roller 11 of the carriage 2 in order to rotate the lettuce 1 whilst the cutting discs 9 cut the base of the outer leaves.

This first operation therefore consists in cleaning the lettuce by the removal of a ring of outer leaves.

The carriages 2 then arrive at the level of a station 11 where mechanical or optical detection means are provided which measure the diameter of the lettuce in order to determine the lateral position of the cutting discs 12 of the subsequent cutting station 13. This station comprises discs 12 disposed in a vertical plane in order to cut the ends of the outer leaves to obtain a lettuce of which the diameter is determined by the detection means of the station 11.

At the two subsequent cutting stations 14 and 15, a first oblique peripheral cut is made in the lettuce by means of discs 16 and then a horizontal cut is made in the end of the leaves located on the axis of the lettuce, by means of the disc 17.

The level of this disc 17 is determined by a measuring means 18.

Subsequently, the carriage is brought to the level of a series of horizontal cutting discs 20 which are superimposed at a distance from one another and which are to cut the portion of the lettuce which is retained after the cleaning process to which it was subjected in stations 8, 13, 14 and 15. The cut lettuce is then recovered whilst the carriage moves towards the station 21 where ramps of cams are provided for opening the gripping device 5.

These closed circuits also comprise pushers 22 disposed in the corners to ensure that the carriages and the continuous belts 23, which move the carriages sideways towards the loading station, change direction. In accordance with the example illustrated, the installation comprises two parallel loading stations $4_1$, $4_2$ at the level of which the lettuces are manually and individually attached, in the suspended state, beneath each carriage.

At the downstream end of these stations $4_1$ and $4_2$ there are also provided distribution stops 23 and 24 between which the carriages provided with lettuces accumulate until no more can be accommodated. The stop 24, located behind the point where the stations $4_1$ and $4_2$ join, allows the carriages 2 to move towards the station 8 in succession and at slight intervals between each other.

Preferably, at least one of the two parallel lines $4_1$, $4_2$ for loading the carriages with lettuces is inclined in the direction in which the carriages circulate such that they move by gravity along the rails and accumulate against the stops 23 and 24 in order to be conveyed.

This conveying path 4 consists at least partially of a pair of parallel continuous belts $3_1$, $3_2$ on which the carriages 2 are supported by means of friction pads 25.

The belts $3_1$ and $3_2$, which are spaced apart from one another, support the carriages 2 such that the heads 26 of these carriages are disposed in the suspended state between these two belts.

The grasping gripping device 5 of each carriage comprises, firstly, a plurality of inclined and curved needles $5_1$ which are slidably mounted at the lower end of the head 26 in order to be able to penetrate the end of the stump of the lettuce, and, secondly, a plurality of hooks $5_2$, of which there are three, for example, which are mounted so as to penetrate sideways the base of the lettuce and/or its stump.

Figure 2:
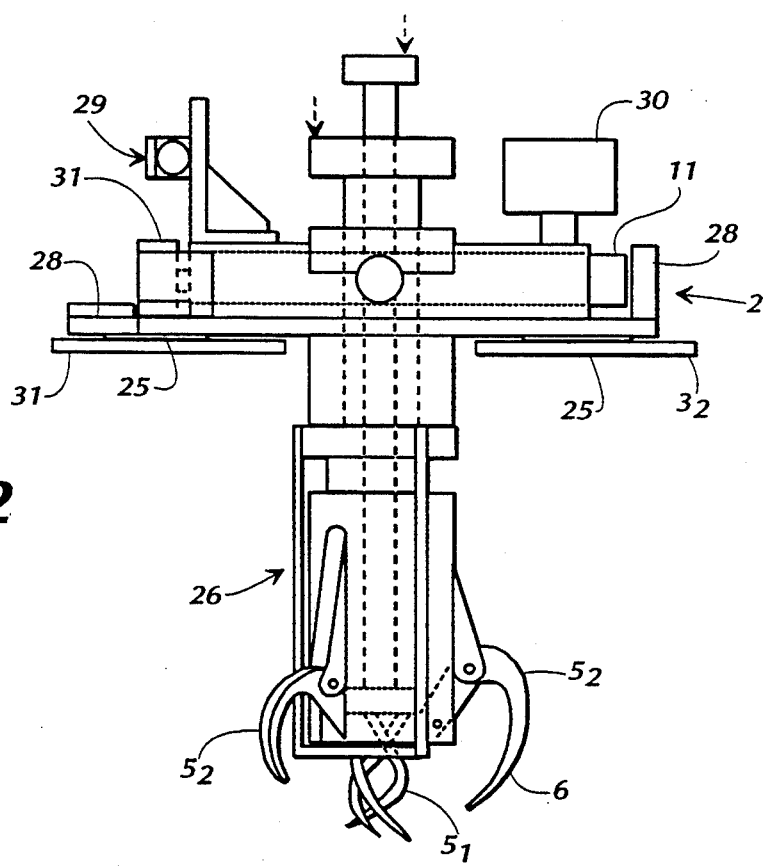
FIG. 2 is a side view of one of the carriages of the installation in FIG. 1.
Figure 3:
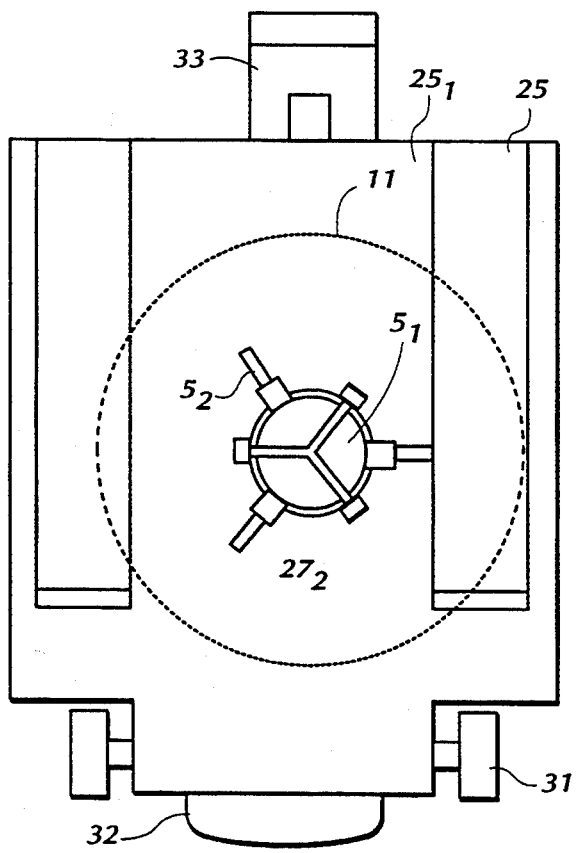
FIG. 3 is a bottom view of FIG. 2.
Figure 5:
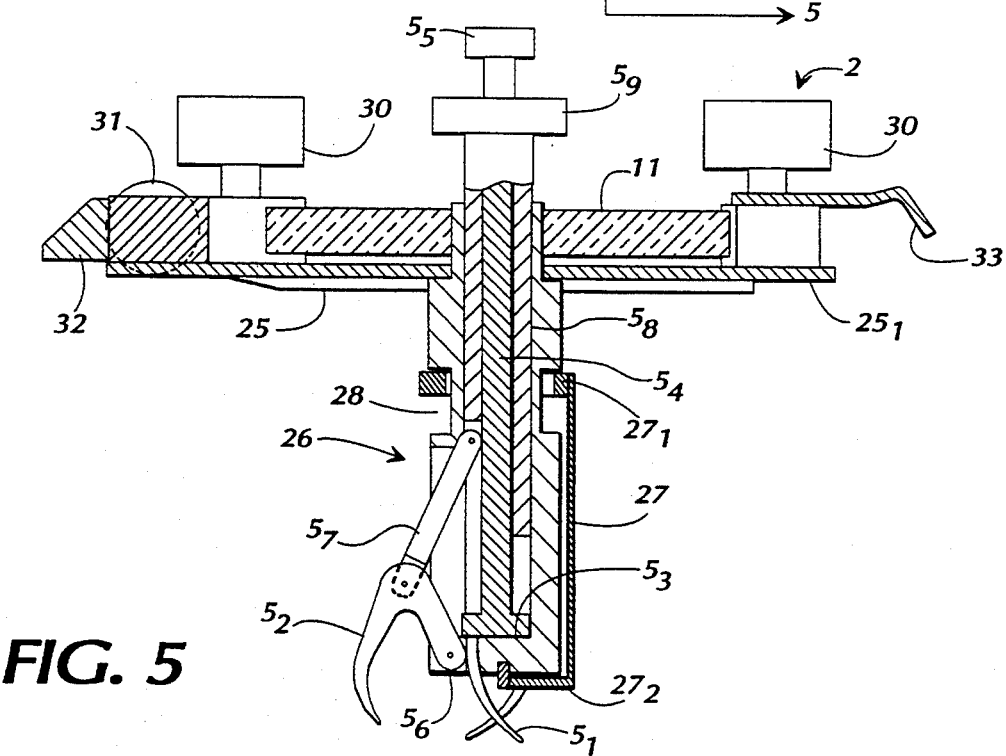
FIG. 5 is a view in section along the line A—A in FIG. 4.

The needles $5_1$ are secured to the end of a piston $5_3$ of which the rod $5_4$ terminates, at its upper end, in a head $5_5$. This head is intended to cooperate with mechanical or electrical jacks and cams disposed in the vicinity of the conveying path 4 for raising or lowering the piston $5_3$ and consequently placing the needles $5_1$ either in the retracted position inside the head 26 or in the extended position as shown in FIGS. 2 and 5 for which the needles $5_1$ penetrate the interior of a lettuce stump.

Figure 4:
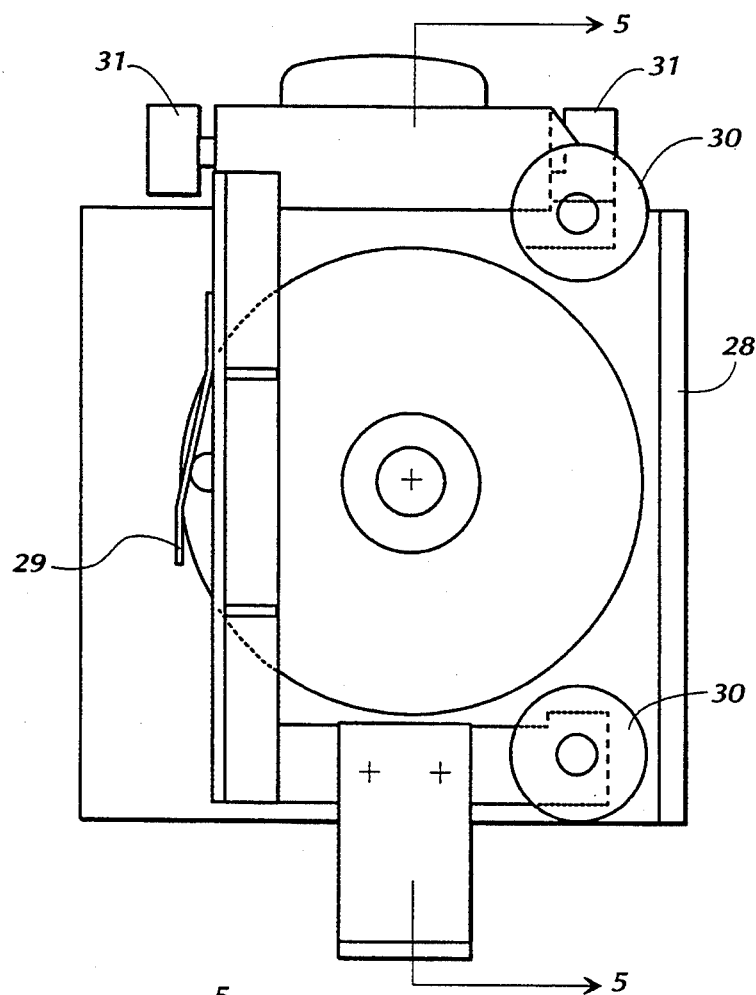
FIG. 4 is a plan view of FIG. 2.

Likewise, the hooks $5_2$, which are pivotably mounted on the shafts $5_6$ of the head 26, are connected to a connecting rod $5_7$ which is itself affixed to a shaft $5_8$ coaxial with the shaft $5_4$. This shaft $5_8$ likewise terminates at its upper end in a head $5_9$ for cooperating with the ramps of cams which can either cause the hooks $5_2$ to move apart, as is shown in FIGS. 2 and 4, or, on the contrary, to move together such that they hook into the base of the lettuce and its stump.

In accordance with the invention, one of the hooks $5_2$ has an end 6 which is longer than that of the other hooks, such that at least this hook can penetrate the lettuce as far as its stump, irrespective of the length of this stump.

The head 26 of each carriage 2 further comprises a feeler 27 which is mounted such that it can slide in a groove 28 in the head, via a collar $27_1$, such that its lower end $27_2$, which is located under this head, can assume two positions which are vertically offset by a distance corresponding to the depth of the groove 28.

This feeler 27 is associated with an electric switch (not illustrated) which is triggered by the feeler when it rises when a lettuce is positioned under the head 26. This switch then activates the jack which acts on the head $5_5$ such that the rod $5_4$ is lowered and the rods $5_1$ are made to emerge in order that they can penetrate the stump of the lettuce which has just been positioned and has raised the feeler 27.

The hooks $5_2$ are only activated subsequently and preferably when the carriage 2, under which the needles $5_1$ retain a lettuce in the suspended state, has moved over the conveying path 4 and is located outside this area in which the lettuces are loaded onto the carriages.

This arrangement prevents accidents which, in view of the high frequency of the operations, might arise if a worker were still holding a lettuce against the head 26 when the hooks $5_2$ are activated.

The head $5_9$ is thus activated, for example by means of a ramp of cams, between the loading station $4_1$, $4_2$ and the first cutting station 9.

When the carriages 2 arrive at the cutting station 9 and at the following cutting stations, the head 26, rotatably supported by the plate $25_1$, is rotatably driven via its roller 11 by means of the roller 10 provided at each cutting station.

In order to facilitate guiding of the carriages along the conveying path 4, they each comprise rigid side guide runners 28 or flexible side guide runners 29 as well as rollers 30 for cooperating with the corresponding guide surfaces.

In accordance with the invention, one of the ends, the so-called rear end, of the carriage 2 is provided with a pair of rollers 31 which project slightly below the base plate $25_1$ of the carriage, whilst being located at a higher level than the friction pads 25.

In addition, this rear end of the carriage comprises a cam surface 32 whilst the other end of this carriage, the so-called front end, comprises a feeler blade 33 produced such that it raises the front end of its carriage when this blade moves up the cam ramp 32 on the rear end of the preceding carriage. In this case, the friction pads 25 are moved away from the continuous belts $3_1$ whilst, on the contrary, the rollers 31 abut these drive belts and are rotatably driven whilst the carriage is immobilised.

This arrangement enables the output of the installation to be increased, by allowing carriages to accumulate at each of the loading or cutting stations. Thus, when an operation on a carriage is terminated at any station, the following carriage can immediately take its place without wasting time.

I claim:

1. In a lettuce cleaning machine comprising carriages (2) which are each provided with a rotatably mounted head (26), a gripping device associated with and supported by each head (5) for grasping a lettuce in a suspended state below the carriages, means defining a closed-circuit conveying path (4) on which the carriages circulate, cutting stations (8, 13, 14, 15, 19) disposed along the conveying path, the stations being provided with means (9, 12, 16, 17, 20) for cutting the lettuce, and means (10) for rotating the heads of the carriages, the improvement wherein the gripping device comprises:

movable needles ($5_1$) which slide between an extended active position for grasping a lettuce as a result of the needles penetrating an end of a lettuce stump and a position retracted inside the head; and movable hooks ($5_2$) which pivot at an end of the head between a spaced-apart position and a closed-together active position for penetrating sideways a base and the stump of the lettuce so as to gasp the lettuce, these needles and hooks being operative to be placed in the active position to grasp a lettuce in different areas of the conveying path.

2. Machine according to claim 1, wherein the needles ($5_1$) are placed in the active position at a lettuce grasping station ($5_1$, $5_2$) of the conveying path (4) and the hooks ($5_2$) are subsequently placed in the active position in the direction in which the carriages advance along the conveying path.

3. Machine according to claim 1, wherein one of the hooks ($5_2$) is longer than the other hooks.

4. Machine according to any one of the preceding claims, wherein the conveying path (4) consists at least partially of a pair of continuous belts ($3_1$, $3_2$) supporting the carriages by friction pads (25).

5. Machine according to claim 1, wherein the carriages (2) comprise at both ends additional means (32, 33) for raising one of the ends of the carriage by means of the other end of the carriage which precedes it in the direction of advance along the conveying path, the end of the carriage which is notaised being provided with rollers (31) for supporting the raised carriage in the raised state on the continuous belts.

6. Machine according to claim 5, wherein the carriages are provided with beating surfaces (28, 29) cooperating with cam surfaces in order to guide the carriages on the conveying path and immobilize the carriages at the cutting stations.

* * * * *